F. H. RICHARDS.
MACHINE FOR MAKING TYPES AND TYPE BARS.
APPLICATION FILED JULY 16, 1908.

912,169. Patented Feb. 9, 1909.
7 SHEETS—SHEET 1.

Fig.1.

Witnesses:
Inventor:

F. H. RICHARDS.
MACHINE FOR MAKING TYPES AND TYPE BARS.
APPLICATION FILED JULY 16, 1908.

912,169.

Patented Feb. 9, 1909.
7 SHEETS—SHEET 2.

Witnesses:

Inventor:

F. H. RICHARDS.
MACHINE FOR MAKING TYPES AND TYPE BARS.
APPLICATION FILED JULY 16, 1908.

912,169.

Patented Feb. 9, 1909.

Witnesses:

Inventor:

F. H. RICHARDS.
MACHINE FOR MAKING TYPES AND TYPE BARS.
APPLICATION FILED JULY 16, 1908.

912,169.

Patented Feb. 9, 1909.
7 SHEETS—SHEET 6.

Fig. 6.

Witnesses:

Inventor:

UNITED STATES PATENT OFFICE.

FRANCIS H. RICHARDS, OF HARTFORD, CONNECTICUT.

MACHINE FOR MAKING TYPES AND TYPE-BARS.

No. 912,169. Specification of Letters Patent. Patented Feb. 9, 1909.

Application filed July 16, 1908. Serial No. 443,878.

*To all whom it may concern:*

Be it known that I, FRANCIS H. RICHARDS, a citizen of the United States, residing in Hartford, in the county of Hartford and State of Connecticut, have invented certain new and useful Improvements in Machines for Making Types and Type-Bars, of which the following is a specification.

An application for this improvement was originally filed on March 6, 1901, under Serial No. 50,016, and was allowed on August 15, 1905, and forfeited for the non-payment of the final fee. On August 7, 1907, it was renewed under Serial No. 387,421 and reallowed on September 9, 1907, and was again forfeited for non-payment of the final fee.

This invention relates to machines for making types and typebars, and particularly to that class of such machines which operate to produce a type through the medium of a die or a die-like instrumentality.

It is an object of this invention to provide a machine in which any one of a number of dies conveyed periodically past the type-forming point may be caused to operate thereat.

It is an object, also, of this invention, to provide a machine in which any one of a number of dies conveyed periodically past the type-forming point may be caused to operate thereat by a rolling action, that is to say, which forms a type as the result of a cycloidal movement of a die with respect to type-formable material located at the type-forming point.

It is an object, furthermore, of the present invention to provide a machine in which a die or die-like instrumentality normally located in a different plane to that of the portion of the stock or blank upon which a type is to be formed may be shifted into such plane and caused to operate.

The accompanying drawings illustrate a machine embodying my present invention, and in these drawings

Similar characters designate corresponding parts in all the figures of the drawings.

The terms "normal" and "normally" are used herein to indicate positions which may be assumed by operative parts when arranged for operation, but not in operation.

In carrying out my invention the several dies are conveyed periodically past the type-forming point, and for attaining this periodic motion of the dies they may be mounted upon a carrier. Such carrier may conveniently be a rotary carrier or turret, as shown, and which is designated generally by T. This turret T, in the present case, embodies a shaft 2 mounted at one end in bearings formed in or supported by an end frame 3, erected upon the base-frame, designated generally by B, of the machine. At the other end this shaft 2 is journaled in a bracket 4 extending from the opposite end frame 5 which is also secured to the base-frame B. This base frame B may be of any suitable construction and form for supporting the various operative parts of the machine. In the present construction, end disks 6ª and 6ᵇ secured to the shaft 2 constitute with the latter the turret T.

The dies employed for the production of a type may be of any desired form appropriate to the particular mode of action which it is proposed that a die shall have: For instance, each die may be a plain die unprovided with any accessory part, or parts, or the die may be supplied with a retaining lip upon one or both sides acting as a wall to confine a movement in the mass of typeformable material upon which the die is operating and direct such movement transverse to the blank.

Figures 3, 17, 18:
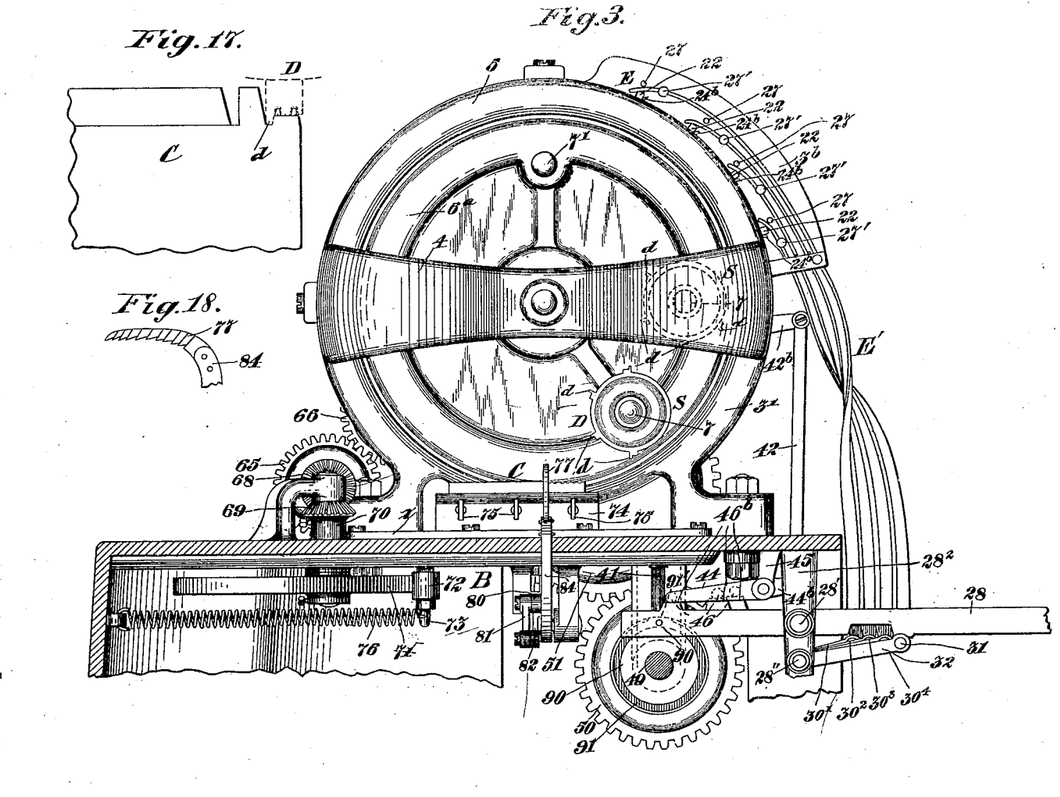
Fig. 3 is an end elevation of the machine, parts also in this figure being shown in section and certain of the parts being omitted.
Fig. 17 is an enlarged elevational view of a portion of a typebar-blank representing a die in the act of operating thereon to produce a type and indicates also the preliminary treatment to which the edge of a bar is subjected to isolate thereon a type-block.
Fig. 18 is a detail view of a portion of a device designed for isolating a type-block on the edge of a blank.

For the purposes of the present illustration, a die, designated generally by D, is shown provided with a retaining lip $d$ adapted to enter a cross slot in the edge of a bar, which serves to isolate a portion thereof, and upon which isolated portion the die acts. In the present case, also, the blank, designated generally by C, is disposed in the same or an approximately parallel plane to that of the path described by the die in its progressive movement toward and away from the blank, but the relative position of the latter may be varied. It may have its longitudinal edges trimmed also as shown in Fig. 17 to remove the bulk of the excess material prior to the formation of types on the blank.

According to the present invention, a number of dies are disposed transversely with relation to the plane of that portion of the edge of the blank upon which a type is about to be made, any one of which dies is adapted to be brought or shifted into that plane for the purpose of operating upon the blank to form a type. This operative plane is designated by P—P, in Figs. 7 to 10, inclusive. For the purpose of increasing the number of dies capable of being operated in the machine, dies may also be located around the periphery of one or more die-wheels, as shown, and to render each die upon the periphery of a wheel operative to form a type each wheel is adapted to be rotated and shifted axially to bring any particular die on that wheel into juxtaposition with the blank at the type-forming point.

The various movements of which a diewheel is capable, that is of rotation and axial shifting as the turret rotates, may be conveniently effected by attaching the same to a shaft 7. Two such shafts are shown in the present instance each provided with a set of die-wheels, (each die-wheel with its dies being designated generally by S,) and each of which sets comprises four wheels. It will, however, be manifest that instead of using separate die-wheels S rigidly secured together a single wheel or drum may be used having the dies disposed thereon axially and also around its periphery.

Figures 12, 13, 14, 15, 16:
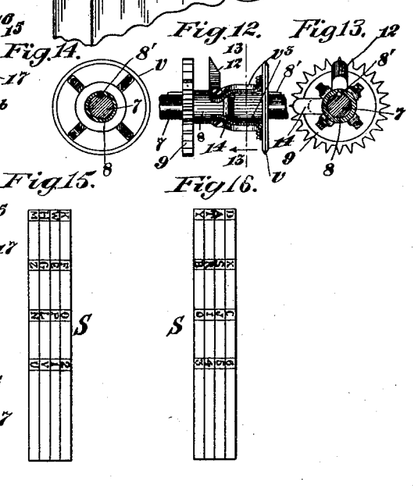
Fig. 12 is a view of a detail concerned in the rotation of a die-wheel.
Fig. 13 is a cross section on the plane of the line 12—13, in Fig. 12, looking in the direction of the arrow adjacent to that line.
Fig. 14 is a similar section on the same line but looking in the opposite direction.
Figs. 15 and 16 represent the development of the circumferential surfaces of different die-wheels.

Each shaft 7 is mounted in the turret T, and adapted to be rotated in its bearings as well as shifted axially of the turret axis to bring any die into the operative plane and to the operative or type-forming point as the turret rotates. Each shaft in the present case is mounted in the disks 6ª and 6ᵇ. Rotation of a shaft 7 to bring a desired die D rotarily to the type-forming point as the turret rotates may be effected in any suitable manner, or the mechanism illustrated herein may be adopted. As shown, this mechanism comprises a sleeve 8 movable longitudinally or lengthwise of each shaft 7, but compelling the latter to rotate with it by means of a feather 8′ extending from the shaft and engaging with a slot, (Figs. 13 and 14) in the sleeve. Movement of each sleeve 8 in one direction serves to engage a gear-wheel 9 attached to the sleeve with a driver 10, here shown to be an internal gear-wheel. The disengagement of the gear-wheel from its driver is occasioned by a movement of the sleeve in the opposite direction. The former of these to and fro movements results, in the present instance, from the coaction of a fixed actuating member or cam 11, secured to a stationary portion of the machine with a coacting member or cam-arm 12, one for each sleeve 8, moving in unison therewith. Normally, that is when no die is operating or moving to an operative position, each cam-arm 12 will occupy a position such that it will not contact with the cam 11 during the rotation of turret T. When, however, a shaft 7 is set rotating upon its axis the sleeve 8 rotating in unison with it will at some period of its rotary and orbital movement swing the arm 12 into contact with the cam 11, whereupon the continued rotation of the shaft about its own axis during its revolution about the axis of the turret will cause the shifting of the sleeve 8 endwise and eventually the engagement of the gearwheel 9 thereon with the driver 10. A positive rotation of the shaft will then ensue upon the further rotation of the turret. A similar device may be used to return each sleeve 8 to its original or inoperative axial position and withdraw the gear-wheel 9 from engagement with the driver 10. This device may consist, as here shown, of an oppositely-facing fixed actuating member or cam 13, secured to a stationary portion of the machine, and a coacting member or camarm 14 projecting from each sleeve. The length of this fixed cam 13 and the relation of its position to that of the cam 11 is such that it will not operate to return a sleeve to its normal or inoperative position until after the operative die on the die-wheel S attached to the shaft of that sleeve shall have completed its work, when, by virtue of the continued rotation of the turret the arm 14 is brought into contact with the cam 13, and the sleeve is shifted backwardly in a manner similar to that already described with reference to the action of cam 11 and cam-arm 12.

It is important for the correct operation of the machine that, whenever a shaft 7 ceases rotation about its own axis, it shall come to rest in the same definite position each time. This result is accomplished, in the present instance, by a device which I may term a precision-brake, comprising, as shown for each shaft, a detent 15 supported at the end of a spring-arm 16, secured at the opposite end disk $6^b$—, and which is adapted to engage with the notched portion of a boss 17 affixed to each shaft and to coöperate therewith to bring the shaft to rest in a definite position.

The means illustrated in the drawings accompanying the present specification for initiating the rotation of each shaft 7 and for continuing the same until the gear-wheel 9 of the sleeve 8 encircling the shaft engages with the driver 10, comprises a starting-arm 18 extending from each shaft. The construction of each of these starting-arms is such as to cause its coaction with a projected latch of a latch mechanism, a form of which will presently be described, and the construction and operation of the arm may be such as set forth in Patents Nos. 401,371 and 573,620, granted to me on April 16, 1889, and December 22, 1896, respectively, which patents may be consulted for a more detailed description. Suffice it here to say that the starting-arms on the die-wheel shafts 7, 7 are arranged in different planes transverse to the axis of the turret T, and are each provided with a resetting heel 19 for resetting the projected latch as set forth in said patents.

In the operation of the machine each shaft 7 is given a definite amount of rotation from the commencement of such movement up to a fixed point, that is, the point where a die on a die-wheel on that shaft is to operate, and these amounts of rotative movement are different, though equally definite, for each die. In other words, a shaft is started in rotation at different points in the circle of rotation of the turret T according to the particular type which is to be formed. For the purpose of securing these various degrees of rotary movement as aforesaid a number of selective devices (herein shown in the form of latch mechanisms) may be employed, which are disposed around the axis of rotation of the turret T. Each latch mechanism is provided with a latch adapted when disengaged to protrude into the path of the corresponding starting-arm when swung around by the rotation of its shaft. The various latch mechanisms for operating any single shaft 7 may be supported in a latch frame, while the latches are disposed in the same plane transverse to the shaft as the particular starting-arm with which they are designed to coöperate.

Figs. 7 to 10, and 12 to 14, inclusive, show certain means which may be used for retaining each sleeve 8 in its two axial positions corresponding to the engaged and disengaged positions of the gear-wheel 9 on the sleeve. As shown, these means comprise a disk $v$ for each sleeve having an angular edge which is adapted to engage with annular notches or recesses $v'$ $v^a$ and hold the sleeve in a corresponding position as the latter assumes one axial position or the other during the rotary and orbital movement of the shaft which it encircles. Each disk $v$, in the present instance, is supported by spring arms $v^3$ from its sleeve 8 which permit the disk to slip from one notch and cause it to engage with the other as the sleeve is shifted axially, leaving the shaft free to move lengthwise of the sleeve.

Referring now to the particular construction set forth in the accompanying drawings, each latch frame E comprises flanges 21 and 21′ extending axially of the turret shaft and from an extension $3^b$ of an upright $3^1$ through openings in which flanges the several latches 22 pass. A latch frame is, in the present instance, located on each side of said upright $3^1$, and the several latches 22 are held in their respective flanges 21, 21′ by means of retaining plates 23, 23′. In number these latches 22 correspond to the number of dies D disposed around the periphery of any single die-wheel S, and each latch is held in its normal or retracted position by the engagement of a shoulder 24 upon the latch with the edge of one of the flange openings in which it is located, engagement being assured by a spring $24^b$, which tends to force the latch toward the side of the opening. When released by the disengagement of the shoulder 24 from the edge of the opening the latch is thrown inward by a spring 25 against a stop 26.

Each latch 22 is released and permitted to be thrown inward by means of an actuator, designated generally by E′, whose curved upper end according to the present construction is adapted to bear against the latch and is properly guided to actuate the same by means of guides 27, 27′.

In the present instance, the actuators E′ are operated by a series of rock-levers, designated generally by 28, which are shown fulcrumed intermediate their ends to a fulcrum bar 28′ extending between brackets $28^2$, $28^3$ projecting downwardly from the base-frame B. The rock-levers 28 are not connected directly to the actuators E′ in the present construction but serve to operate them through the medium of a set of swinging frames $30^1$, $30^2$, $30^3$, $30^4$, one for each actuator. Each of these frames, in the present instance, comprises a cross-rod of suitable length and designated generally by 31, each frame being provided with a suitable elevating spring 31$^b$. The several cross-rods 31 are fulcrumed by side links 32, 32 to a fulcrum bar 28″ extending between the brackets 28$^2$ and 28$^2$. There is a set of these swinging frames 30$^1$, 30$^2$, 30$^3$, 30$^4$, for each set of actuators E′ designed to coöperate with the starting-arm 18 on a die-wheel shaft 7 and to each of which actuators a frame is connected. To enable a particular rock-lever 28 to operate a particular frame those portions of the underside of the other rock-levers in the set in which the lever in question is included and which lie adjacent to the other cross-bars 31 of the set of frames are removed or cut away, as indicated, so as to render that lever operative only to actuate the frame desired.

It will be plain from the foregoing description that upon the depression of a rock-lever 28, the frame upon which it bears and consequently the actuator E′ connected to it will be operated, resulting in the protrusion of the corresponding latch 22 into the path of the corresponding starting-arm 18 if the same be swinging. Through the operation of the described mechanism a particular die will be brought to a position rotarily in juxtaposition to the type-forming point, although it may not be in the operative plane. It may be mentioned that these rock-levers 28 may be provided with keys (not shown) on their outer ends to facilitate their operation and with elevating springs as usual. The operation of any particular lever 28, however, serves not only to initiate the rotation of a shaft 7, as aforesaid, but also to shift the shaft axially to bring the particular die which is being brought rotarily into juxtaposition to the type-forming point into the operative plane, in the event that such die should be out of that plane. Any suitable mechanism may be provided for accomplishing this result, or that herein shown, which will now be described.

Figure 1:
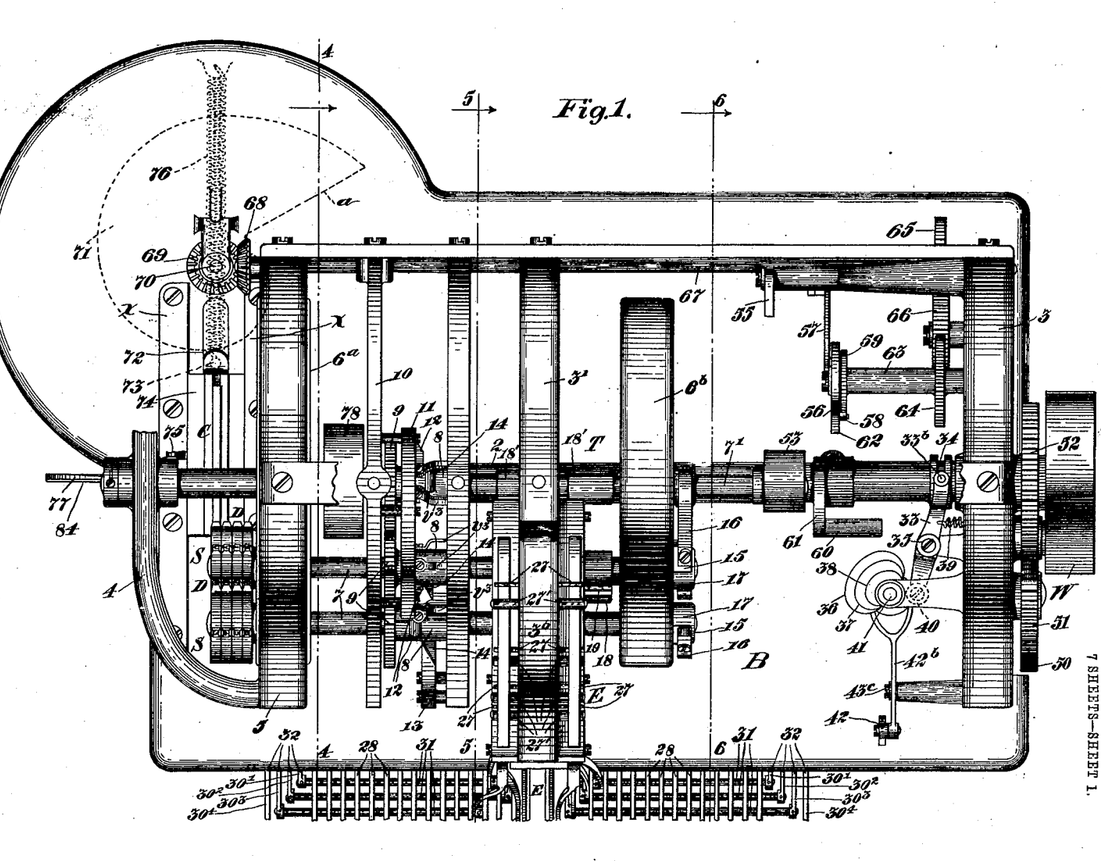
Figure 1 is a plan view of such a machine, the key-board and a portion of the operating levers being omitted.
Figure 6:
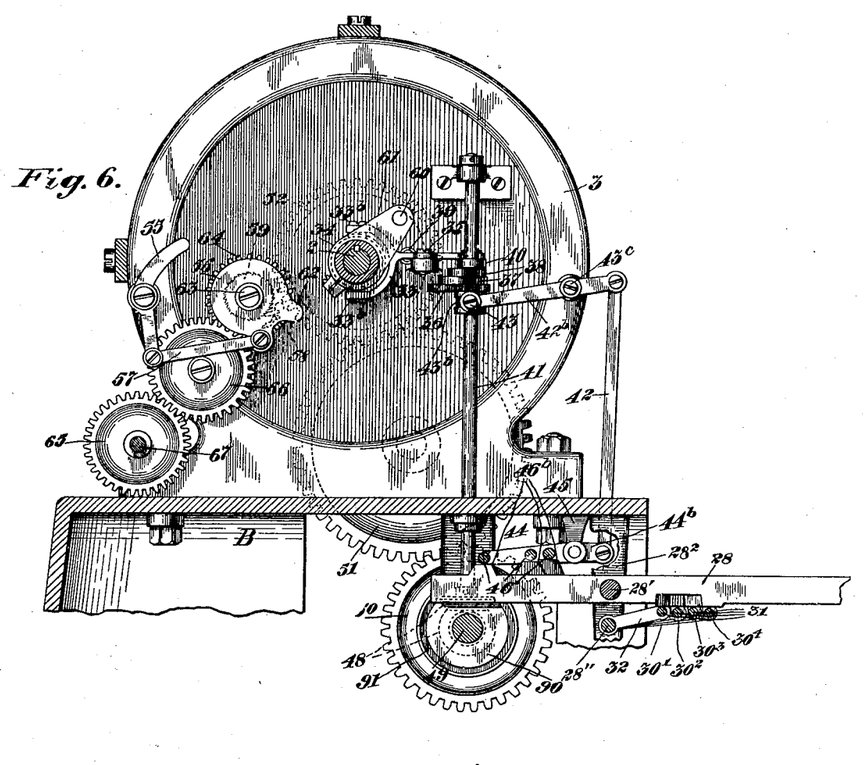
Fig. 6 is a section on the plane of the line 6—6, in Fig. 2, looking in the direction of the arrow adjacent to that line.
Figure 7:
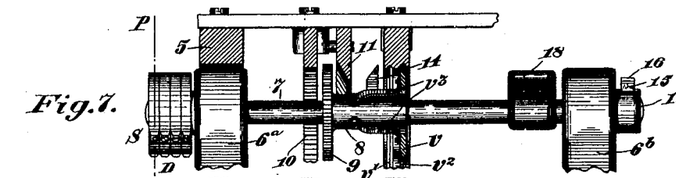
Figs. 7, 8, 9, and 10 are elevational views representing different axial positions assumed by certain of the parts when the same are shifted axially to bring different dies into the operative plane.
Figure 8:
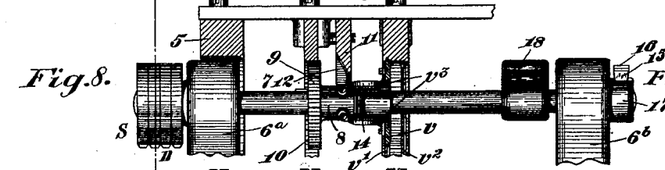
Figure 9:
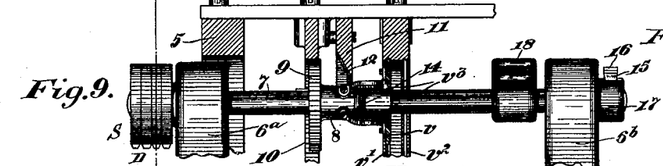
Figure 10:
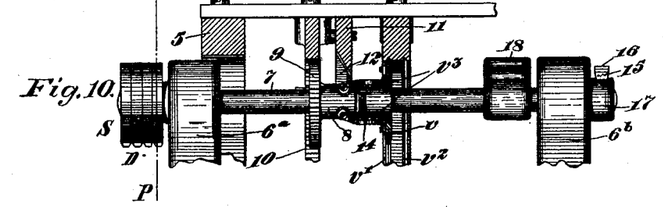
Figure 11:
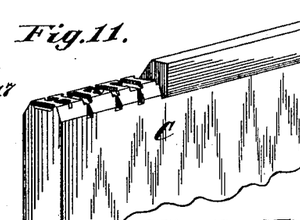
Fig. 11 is a perspective view on a somewhat larger scale than the preceding views representing a portion of a partly finished typebar having a number of types upon its edge.

It may be premised in the particular embodiment herein set forth that the turret T as a whole is shifted axially through the operation of the mechanism designed to shift the die-wheels axially. A vibratory shifting lever 33 (see particularly Figs. 1 and 6) forked at its end and provided with pins 33$^b$ entering an annular groove 34 in a boss on the shaft 2 of the turret T is adapted to be swung on its pivot-pin 35 to shift the turret axially by means of a plurality of actuating devices, herein shown in the form of cams 36, 37 and 38. Normally, the shifting lever 33 is drawn to one end of its vibratory movement by a spring 39 in which position of the parts a die-wheel on each shaft 7 lies in the operative plane P—P, as shown in Fig. 1 and Fig. 7. Hence the actuation of these rock-levers 28 which are referable to the dies on the die-wheels normally lying in the operative plane will effect no axial shifting of the turret, but serve merely to initiate the rotation of the die-wheels. The shifting lever 33 may, however, be swung forward against the tension of said spring 39 by means of a roller 40 adapted to bear against said cams. These cams 36, 37 and 38 are adapted to be shifted axially along a splined rod 41 by means of a rod 42 provided at its upper end with a cam-shifting lever 42$^b$. One end of this lever 42$^b$ is forked and provided with pins 43, 43 which enter an annular groove 43$^b$ in an extension of the body of the cams 36, 37 and 38, while the lever is pivoted at 43$^c$ intermediate its ends to a fixed portion of the frame and connected by an arm 44$^b$ to a swinging frame 44 fulcrumed to brackets 54, 54 adjacent to opposite ends of the machine. This frame 44 is provided with a depressing spring 44$^c$ and a number of cross-rods 46 disposed above the rock-levers 28, any particular one of which latter when actuated may be caused to impinge, by means of a contact projection 46$^b$, of said lever, against a particular cross-rod of the frame and so enable the frame to be swung upon its fulcrum while the other levers are inoperative to accomplish such movement of the frame. It will be noticed that these cross-rods 46 of the frame are arranged at different distances from the fulcrum axis of the frame, hence the amount of arc through which a frame is swung will depend upon which cross-rod 46 the contacting portion 46$^b$ of the actuated rock-lever 28 bears against, assuming that each rock-lever is capable of the same amount of angular movement, which is the case here. Hence by reason of the different amounts of movement that may be imparted to the frame 44 the different cams 36, 37 and 38 may be brought into contact with the roller 40 to shift the turret T axially a corresponding amount.

Figure 2:
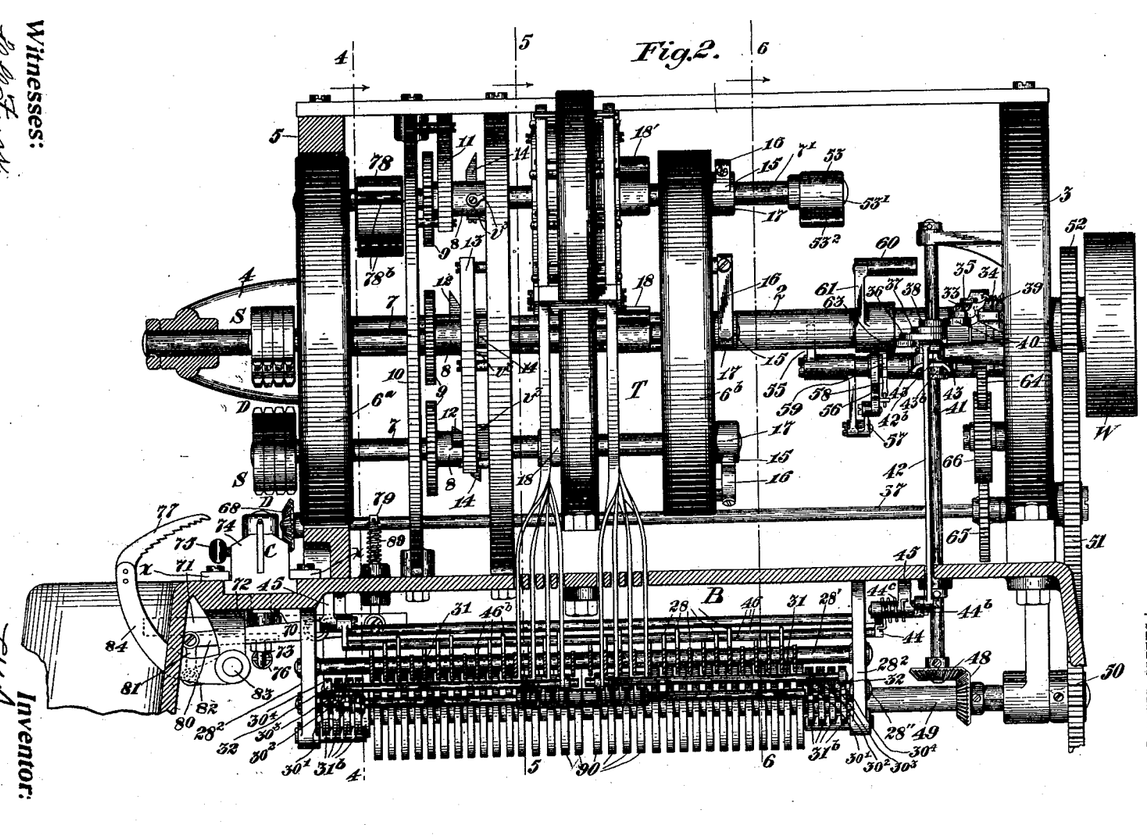
Fig. 2 is a front elevation of the machine, parts being shown in section while other parts are wholly omitted.

It will be noticed, particularly in Fig. 2, that the axial face of each cam 36, 37 and 38, at a certain portion of its periphery is in substantial alinement with a corresponding portion of the other cams. Hence when these portions are in contact with the roller 40 the latter is unobstructed in its movement across the axial faces of the entire set of cams.

Motion is imparted to the rod 41, acting as a driver to rotate the cams by means of gears 48, 48, driven from a shaft 40 provided with a gear-wheel 50, meshing with an intermediate gear-wheel 51, which in turn is driven from the turret shaft 2 by means of a gear-wheel 52. A band wheel or pulley wheel W may be attached to the turret shaft 2 for the purpose of driving the same.

Figure 4:
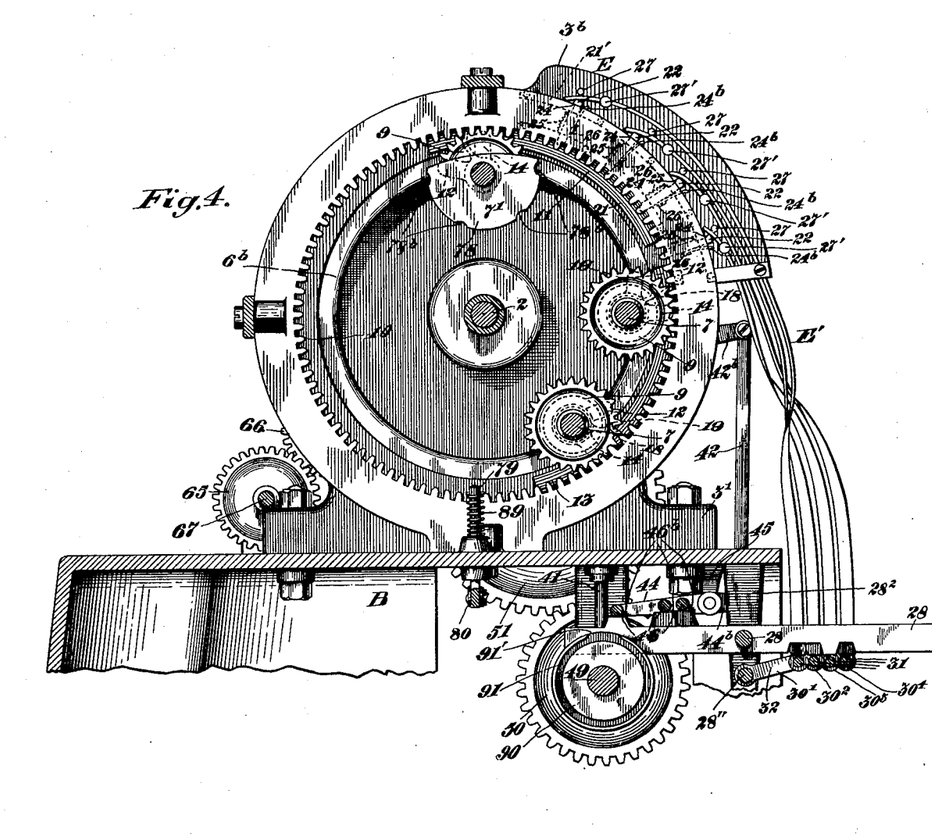
Fig. 4 is a section on the plane of the line 4—4, in Fig. 2, looking in a direction of the arrow adjacent to that line.

Mechanism is provided in the present machine for imparting a step-by-step or intermittent feed movement to the blank to bring different portions of its edge to the operative point whereby types may be made in succession thereon. This mechanism comprises, in the present instance, a shaft $7^1$ similar to the corresponding shafts 7, 7 already described, and similarly mounted in the turret T to rotate about its own axis and move axially in unison with the turret. This shaft is provided with a starting-arm 18′ in each of the planes of the starting-arms 18, 18 described as extending from the die-wheel shafts 7 and 7. This shaft 7′ is provided with a feed-wheel 53 which, in order to secure feed movements of various amounts, is provided with peripherical portions of different radius, (see $53^1$, $53^2$, $53^3$, $53^4$, for instance.) The starting-arms 18′, 18′ on the feed-wheel shaft, are unlike either of the starting-arms 18, or 18, however, in that they are unprovided with any resetting heel as in the latter arms, thus leaving the actuating latch in a projected position after having coacted with them. According to the present construction, the motions of this feed-shaft 7′ is precisely similar to the motions of the die-wheel shafts 7, 7, that is to say, it is rotated a definite amount by the projected latch and is carried axially in unison with the other shafts by the turret when the latter is shifted upon its axis. Similar mechanism may be used for effecting these various movements comprising a cam-arm 12 shown in dotted lines in Fig. 4, extending from a sleeve 8 mounted upon the feed-wheel shaft and adapted to coact with the cam 11 to engage the gear-wheel 9 on the sleeve with the driver 10. There is also provided a similar cam-arm 14 extending from the sleeve 8 and adapted to coact with the returning cam 13, as before, while the shaft may be supplied with a similar detent 15 supported upon a spring arm 16, which detent is adapted to coöperate with a notched boss on the shaft to bring the latter to rest in a definite position, as previously explained. The sleeve 8 on this shaft also carries a rotating ring (not shown) carried on spring arms $v^3$ and coöperating with the annular recesses $v^1$, $v^2$ for a purpose evident from what has already been said. The periphery of this feed-wheel 53 is adapted upon its independent rotation to impinge against and swing outward a feed-arm 55 at some time during the rotary movement of the turret T. When so actuated the feed-arm 55 serves to partially rotate a pawl-carrier 56 connected by a link 57 to the feed-arm. During this movement of the pawl-carrier a spring-pressed pawl 58 supported thereon slips idle over the teeth of a ratchet-wheel 59, whose axis in this instance is concentric to that of the pawl-carrier. When the feed-wheel 52 has passed out of contact with the feed-arm 55 a wiper 60, extending from an arm 61 affixed to the turret shaft 2 comes in contact with a projection 62 upon the pawl-carrier 56 and effects the movement of the latter in the opposite direction. Such movement rotates the shaft 63 of the ratchet-wheel to which the ratchet-wheel is attached. To this shaft 63 is secured a gear-wheel 64, serving to rotate a gear-wheel 65 by means of an intermediate gear-wheel 66. The shaft 67 to which the gear-wheel 65 is secured is provided at the opposite end, in the present instance, with a bevel-wheel 68, meshing with a corresponding bevel-wheel 69, to whose shaft 70 is secured a cam 71. Against this cam 71 there bears a cam-roller 72 mounted upon a projection 73 extending from the blank holder 74. This holder 74 is provided with a suitable slot to receive the blank, in which slot the blank may be clamped by any suitable means, for instance, screws 75 shown. Contact between the roller 72 and the cam 71 is assured by a spring 76. This blank holder 74 is suitably mounted to move back and forth under the action of the cam 71 and spring 76. On examining Fig. 1 in which the cam is shown in dotted outline it will be noticed that this outline is similar to a spiral. Hence as the cam is rotated in an intermittent manner, this spiral edge operates to push the blank-holder further and further from the center of the spiral until the last portion of the edge of the blank has been brought to the type-forming point, whereupon the radial edge, (see $a$,) of the cam comes opposite the holder and the holder is returned by the spring 76 to its original position. In the present construction the holder 74 is mounted in a channel formed in the base frame B and confined to its lengthwise movement therein by plates, or gibs, $x$, $x$.

It should be stated that while the turret T is rotating with the various parts out of action that a portion of the periphery, of reduced radius, on the feed-wheel 53 and each die-wheel comes opposite their respective coöperate parts. Hence these parts will not be operated under these conditions.

As organized in the present instance, prior to the operation of a die upon the blank and following the actuation of the feed mechanism to shift the blank-holder and a contained blank to bring a portion of the unacted-upon edge of the blank into a position in which a type may be formed, mechanism is operated for slotting the edge of the blank transversely to isolate a type-block. The mechanism for the purpose as herein shown comprises a saw 77 adapted to move across the blank and actuated in the present instance through the medium of an actuator 78 attached to the feed-wheel shaft 7'. When the feed-wheel shaft is set in rotation by means of the projection of a latch the actuator 78 is brought into position through the rotation of the turret to coact with a plunger 79 and depress the same by reason of the impingement of the actuator during its revolving and rotating motion as it rolls over the head of the plunger, which seats itself in one of the notches 78$^b$ in the edge of the actuator. This plunger 79 is connected to a lever 80, which in turn is connected by a link 81 to an arm 82 rigid with a shaft 83, from which latter the arm 84 of the saw 77 extends. Hence, when the turret T is rotating and the feed-wheel shaft 7' is rotating about its own axis, the plunger 79 will be actuated to push the saw across the edge of the blank in the holder 74 and form a cut therein to remove excess material at the side of the type-block and between it and an adjacent portion to be afterwards formed into a type. A spring 89 serves to elevate this plunger 79, withdrawing the saw into the position shown in Fig. 2 and permitting the proper operation of the die.

Since the proper procedure in the operation of the machine requires the feed-wheel shaft 7' to operate in advance of either die-wheel shaft 7, it is essential that when a latch 22 has been projected as a result of depressing a key that the first starting-arm to engage with it shall be a starting-arm 18' on the feed-wheel shaft, as otherwise a die might be brought to the operative or type-forming point before the portion of the blank previously provided with a type has been shifted away from the operative point. To preclude, therefore, an incorrect operative procedure, the rock-levers 28 in the present illustrative embodiment are locked during the entire rotation of the turret T, except for that portion of such rotation represented by the angular movement of the turret from a position in which the starting-arm 18 on the shaft 7 of the last die-wheel has just passed out of possible engagement with any latch 22 in the series located in its plane to a position in which either of the starting-arms 18', 18' on the shaft 7' of the feed-wheel 53 can engage with the first latch in either frame if the same be projected while the starting-arm is advancing toward it. If, during this portion of the turret's rotation a latch is projected, it is evident that the first starting-arm to contact with it will be one of those on the feed-wheel shaft, and since, as before stated, neither of these starting-arms is provided with a resetting heel, the latch will remain in its projected position even though the shaft of the feed-wheel has been swung around and set in rotation, as already pointed out. Further movement of the turret will bring the corresponding starting-arm on one of the die-wheel shafts into contact with this same latch and result in an identical amount of rotation of the latter shaft, whereby the operative die will form a type, as explained.

Figure 5:
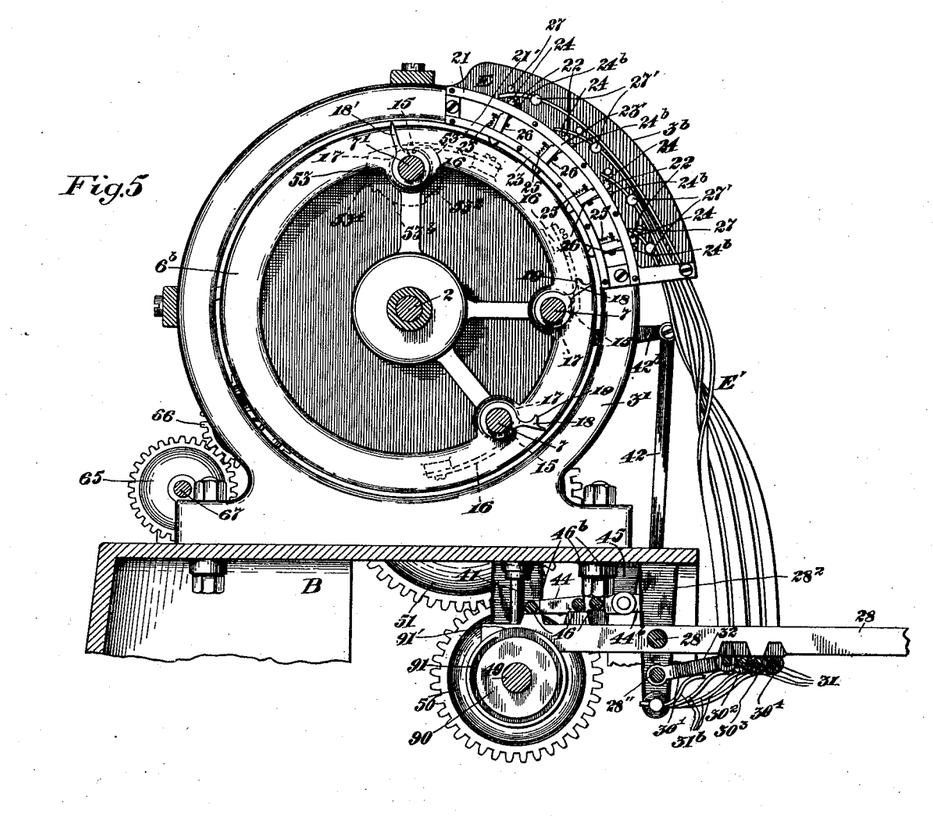
Fig. 5 is a section on the plane of the line 5—5, in Fig. 2, looking in the direction of the arrow adjacent to that line.

The locking means provided in the present case consists of a number of disks 90 secured to the shaft 49, and lying in such a position with respect to the several rock-levers 28 as to prevent the actuation of any one of the same, except for such previously described period, through the medium of a pin 90' extending from each lever and entering an annular groove 91 in its corresponding locking disk 90. The outer wall of this groove 91 is removed at one portion only of its circumference, (see 91' Figs. 4 and 5,) corresponding to that period in which a lever may be actuated to secure the proper procedure in the various movements and operations of the machine.

Although no means have been particularly referred to for reducing the height between words and combinations of words such as exists in the ordinary typebar, some suitable means may be used for the purpose acting to roll or crush down the material of the blank or in any other way. For a feeding of the blank also representing these typeless portions of the bar, a key and its lever 28 may be so combined with the feed-wheel 53 and a die-wheel that while it causes the first to operate in the manner aforesaid, it will bring a portion of the die-wheel unprovided with a type in juxtaposition to the blank.

A machine organized and constructed in the manner described and set forth in the drawings, operates substantially in the following manner: Assuming that a rock-lever 28 has been depressed, which it will be evident from what has last been said can occur only when a proper sequence of operations is assured, that frame of the series 30$^1$, 30$^2$, 30$^3$, 30$^4$ with which the particular lever is designed to coöperate will be actuated, resulting through the movement of the corresponding actuator E in the projection of a latch 22. This same movement of the rock-lever may effect, as pointed out, the shifting of the cams 36, 37 and 38 to bring a particular one of them into contact with the cam-roller 40, thereby resulting in the axial shifting of the turret T longitudinally. It is plain from what has been described that the first starting-arm to engage with the projected latch will be a starting-arm 18' of the feed-wheel shaft 7', which shaft, in consequence, causes the impingement of the feed-wheel 53 against the feed-arm 55 and the shifting of the blank-holder 74. Continued rotation of the turret T will result in the movement of the saw 77 to isolate a type-block at the rear of the one about to be operated upon. The next starting-arm to engage with the projected latch will be that one on the die-wheel shaft which lies in the plane of the latch, resulting in the formation of a type in the manner described. Further movement of the turret will cause its axial shifting, carrying the die-wheel which has been shifted into the operative plane, out of the same and effecting the return of the various parts to their original positions.

Having described my invention I claim:

1. The combination with an orbitally rotatable carrier, of a die mounted thereon and normally located out of the plane in which it operates, and means for shifting the die into that plane.

2. The combination with an orbitally rotatable carrier, of a die mounted upon said carrier and normally located out of the plane in which it operates, and means for shifting it into that plane and conveying it past the type forming point.

3. The combination with an orbitally rotatable carrier, of a die mounted on said carrier and normally located out of the plane in which it operates, and means for shifting it into that plane and for conveying it periodically past the type forming point.

4. The combination with an orbitally rotatable carrier, of a die mounted on said carrier and normally located out of the plane in which it operates, means for shifting it into that plane and for conveying it periodically past the type forming point, and means for rendering the die operative to form a type.

5. The combination with an orbitally rotatable carrier, of a number of dies mounted upon said carrier and normally located out of the plane in which they operate, and means for shifting any one of the dies into that plane.

6. The combination with an orbitally rotatable carrier, of a number of dies mounted upon said carrier and normally located out of the plane in which they operate, and means for shifting any one of the dies into that plane and for conveying them past the type forming point.

7. The combination with an orbitally rotatable carrier, of a number of dies mounted upon said carrier and normally located out of the plane in which they operate, and means for shifting any one of the dies into that plane and for conveying them perodically past the type forming point.

8. The combination with an orbitally rotatable carrier, of a number of dies mounted upon said carrier and normally located out of the plane in which they operate, means for shifting any one of the dies into that plane and for conveying them periodically past the type forming point, and means for rendering the shifted die operative to form a type.

9. The combination with an orbitally rotatable carrier, of dies mounted thereon and normally located in a plane parallel to the plane in which they operate, and means for shifting the dies into that plane and for rendering one of said dies operative to form a type.

10. The combination with an orbitally rotatable carrier, of a number of dies mounted thereon, some of said dies being disposed transversely of, and some of said dies being disposed parallel to, the plane in which a die operates, and means for shifting a die into that plane and for rendering it operative to form a type.

11. The combination with an orbitally rotatable carrier, of a number of die wheels mounted on said carrier and disposed side by side and which are rigid with respect to each other, and means for shifting the wheels axially for rotating these to render a particular die operative in the formation of a type.

12. The combination with an orbitally rotatable carrier, of a die mounted thereon, a lever and intermediate mechanism for shifting the die into and out of the operative plane, and means for rendering the die operative to form a type.

13. The combination with an orbitally rotatable carrier, of a die mounted thereon, a lever, an intermediate mechanism comprising a cam for shifting the die into and out of the operative plane, and means for rendering the die operative to form a type.

14. The combination with a number of dies mounted on orbitally rotatable carriers, of levers and intermediate mechanism comprising a series of cams for shifting a particular die into the operative plane and for rendering the shifted die operative to form a type.

15. The combination with a number of orbitally rotatable die-wheels disposed side by side and which are rigid with respect to each other, of levers, means controlled by the levers for shifting any particular die into and out of the operative plane, and means for rotating said wheels to render a particular die operative to form a type.

16. The combination with a number of orbitally rotatable die-wheels, of levers, cams corresponding to the dies normally located out of the operative plane, and means for rotating said die-wheels to render any particular die operative to form a type.

17. The combination with a number of orbitally rotatable die-wheels, of levers, cams corresponding to the dies normally located out of the operative plane, and means operatively connecting a particular cam with a particular lever.

18. The combination with a number of die-wheels, of levers, cams corresponding to the dies normally located out of the operative plane, and means comprising a swinging frame having cross bars at different distances from the fulcrum axis for rendering a particular cam operative from a particular lever.

19. The combination of a series of levers, and a swinging frame having a number of cross bars, some of said levers being operative to swing the frame by means of one bar and other levers being operative to swing the frame by means of another bar.

20. The combination of a series of cams, a series of levers, a swinging frame having cross bars disposed at different distances from its fulcrum axis, means connecting said frame with said cams, and a shaft for rotating the cams.

21. The combination with a number of dies disposed in different planes, of a series of cams, a series of levers, a swinging frame having cross bars disposed at different distances from its fulcrum axis, means connecting said frame with said cams, and a shaft for rotating the cams.

22. The combination with a number of dies aranged in different planes, of a series of levers, and a swinging frame having cross bars disposed at different distances from its fulcrum axis, one of said bars being operatively connected with some of said levers and another of said bars being operatively connected with another of said levers.

23. The combination with a number of latch mechanisms, of actuators therefor, and a series of frames each connected to an actuator.

24. The combination with a number of latch mechanisms, of actuators therefor, a series of frames each connected to an actuator, and levers for operating said frames.

25. The combination with a carrier, of dies mounted thereon, means comprising latch mechanisms for bringing a die from an inoperative to its operative position, actuators for the latch mechanisms, swinging frames to which the actuators are connected, and levers for operating the frames.

26. The combination with a rotary carrier, of dies mounted thereon, means comprising a latch mechanism for bringing a die from an inoperative to its operative position, actuators for the latch mechanisms, swinging frames to which the actuators are connected, and levers for operating the frames.

27. The combination with a rotary carrier, of dies mounted thereon, means comprising a latch mechanism for bringing a die from its inoperative to its operative position, actuators for the latch mechanism, swinging frames to which said actuators are connected, levers for operating the frames, and means for shifting the carrier axially.

28. The combination with a rotary carrier, of dies mounted thereon, means comprising a latch mechanism for bringing a die from its inoperative to its operative position, actuators for the latch mechanism, swinging frames to which said actuators are connected, levers for operating the frames, and means comprising cams for shifting the carrier axially.

29. The combination with a rotary carrier, of dies mounted thereon, means comprising a latch mechanism for bringing a die from its inoperative to its operative position, actuators for the latch mechanism, swinging frames to which said actuators are connected, levers for operating the frames, and a swinging frame operative from said levers to render different cams effective to shift the carrier axially.

30. The combination with a rotary carrier, of dies mounted thereon, actuating and coacting members for rendering the dies operative, latch mechanism coöperating with said members, actuators for said latch mechanism, swinging frames to which said actuators are connected, levers for operating said frames, and means for shifting the carrier axially.

31. The combination with a rotary carrier, of dies mounted thereon, a feed-wheel, means operative from said feed-wheel to shift a typebar-blank, and means for shifting the carrier axially.

32. The combination with a rotary carrier, of dies mounted thereon, a feed-wheel, a holder for the typebar-blank, means for shifting the holder, and means for shifting the carrier axially.

33. The combination with a holder for a typebar-blank, of feed mechanism comprising a rotating cam for shifting the holder in its guides, and means for returning the holder to its normal position.

34. The combination with a holder for a typebar-blank, of feed mechanism comprising an intermittingly rotating spiral cam for shifting the holder in its guides, and means for returning the holder to its normal position.

35. The combination with a rotary carrier, of dies mounted thereon, a feed-wheel, feed mechanism operative therefrom comprising a rotating cam for shifting a typebar-blank holder in its guides, and means for returning the holder to its normal position.

36. The combination with a die-wheel, of a shaft to which the wheel is attached, a sleeve mounted upon the shaft and which is movable axially with relation thereto, an actuating and a coacting member for shifting the sleeve axially, and independent means for shifting said die-wheel shaft axially.

37. The combination with a die-wheel, of a shaft to which the wheel is attached, a sleeve mounted upon the shaft and which is movable axially with relation thereto, an actuating and a coacting member for shifting the sleeve axially, independent means for shifting the die-wheel shaft axially, and means for retaining the sleeve in positions corresponding to its driven and idle positions.

38. The combination with a carrier, of a die-wheel, a shaft to which the wheel is attached, a sleeve mounted upon the shaft and which is movable axially with relation thereto, an actuating and a coacting member for shifting the sleeve axially, a brake for said shaft, means for retaining the sleeve in its positions corresponding to its driven and idle positions, and means for independently shifting the carrier axially.

39. The combination with a rotatable shaft, of a sleeve movable axially of said shaft, a disk mounted on and rotatable with said sleeve and movable eccentrically thereof, a member having a curved and grooved face fixed concentrically with said sleeve, and means for shifting the disk to permit the engagement of its periphery in a groove in said fixed member.

40. The combination with a rotatable shaft, of a sleeve movable axially of said shaft, a disk mounted on and rotatable with said sleeve and movable eccentrically thereof, a member having a curved face and a plurality of grooves therein, fixed concentrically with said sleeve, and means for shifting the disk to permit the engagement of its periphery in the grooves in said fixed member.

41. The combination with a rotatable shaft, of a sleeve movable axially of said shaft, a disk having an angular periphery, mounted on and rotatable with said sleeve and movable eccentrically thereof, a member having a curved and grooved face fixed concentrically with said sleeve, and means for shifting the disk to permit the engagement of its periphery in a groove in said fixed member.

42. The combination with a rotatable shaft, of a sleeve movable axially of said shaft, a disk having an angular periphery, mounted on and rotatable with said sleeve and movable eccentrically thereof, a member having a curved face and a plurality of grooves therein, fixed concentrically with said sleeve, and means for shifting the disk to permit the engagement of its periphery in the grooves in said fixed member.

43. The combination with an axially movable and rotatable shaft, of a sleeve movable axially of said shaft, a disk mounted on and rotatable with said sleeve and movable eccentrically thereof, a member having a curved and grooved face fixed concentrically with said sleeve, and means for shifting the disk to permit the engagement of its periphery in a groove in said fixed member.

44. The combination with an axially movable and rotatable shaft, of a sleeve movable axially of said shaft, a disk mounted on and rotatable with said sleeve and movable eccentrically thereof, a member having a curved face and a plurality of grooves therein, fixed concentrically with said sleeve, and means for shifting the disk to permit the engagement of its periphery in the grooves in said fixed member.

45. The combination with an axially movable and rotatable shaft, of a sleeve movable axially of said shaft, a disk having an angular periphery mounted on and rotatable with said sleeve and movable eccentrically thereof, a member having a curved and grooved face fixed concentrically with said sleeve, and means for shifting the disk to permit the engagement of its periphery in a groove in said fixed member.

46. The combination with an axially movable and rotatable shaft, of a sleeve movable axially of said shaft, a disk having an angular periphery, mounted on and rotatable with said sleeve and movable eccentrically thereof, a member having a curved face and a plurality of grooves therein, fixed concentrically with said sleeve, and means for shifting the disk to permit the engagement of its periphery in the grooves in said fixed member.

47. In a typographic machine, the combination of an orbitally rotatable and axially movable shaft, a sleeve mounted on said shaft and rotating therewith and movable axially of said shaft, a gear wheel mounted on said sleeve, a fixed driver intermittently engageable with said gear wheel, means for engaging said gear wheel with said driver, and means for disengaging said gear wheel from said driver.

48. In a typographic machine, the combination of a plurality of orbitally rotatable and axially movable shafts, a sleeve mounted on said shaft and rotating therewith and movable axially of said shaft, a gear wheel mounted on said sleeve, a fixed driver intermittently engageable with said gear wheel, means for engaging said gear wheel with said driver, and means for disengaging said gear wheel from said driver.

49. The combination with a carrier, of a die-wheel, a shaft to which the wheel is attached, a sleeve mounted upon the shaft and which is movable axially with relation thereto, an actuating and coacting member for shifting the sleeve axially, a brake for said shaft, means for retaining the sleeve in its positions corresponding to its driven and idle positions, and means comprising cams for independently shifting the carrier axially.

50. The combination with a carrier, of a die-wheel, a shaft to which the wheel is attached, a sleeve mounted upon the shaft and which is movable axially with relation thereto, an actuating and a coacting member for shifting the sleeve axially, a brake for said shaft, means for retaining the sleeve in its positions corresponding to its driven and idle positions, means comprising cams for independently shifting the carrier axially, and levers for rendering the said cams effective to shift the carrier.

51. The combination of a blank holder, a blank-slotting device, a fixed support adjacent to the blank holder and on which the slotting device is mounted, means for actuating such device and thereby slotting the edge of the blank to produce a series of type-blocks, type-making mechanism for forming types upon said type blocks, and means carried by said mechanism for preventing the longitudinal displacement of the type-block which is being worked upon.

52. The combination of a blank holder, rotary type making mechanism for making a succession of type along the edge of a blank in the holder, a blank slotting device, a fixed support adjacent to the blank holder and on which the slotting device is mounted, and means operative from the rotating type making mechanism for actuating said device and thereby slotting the edge of the blank.

53. The combination of a blank-holder, a pivoted cutter for slotting the blank to space the same off into type-blocks upon the edge of such blank, means for shifting the blank a predetermined distance variable with the type-face to be produced, type-making mechanism embodying means for forming types and means for preventing the longitudinal displacement of the type-block being worked upon.

54. The combination of a blank holder, rolling type making mechanism for rolling a succession of types along the edge of a blank in the holder, the plane of the rolling being in line with the blank, a blank slotting device, a fixed support adjacent to the blank holder and on which the slotting device is mounted and means for actuating such device and thereby slotting the edge of the blank.

55. The combination of a die carrier having groups of dies thereon, some at least of the groups of dies being normally out of the plane of the working point, selective mechanism comprising a series of key levers, a number of cams equal to the number of groups of dies normally outside of the plane of the working point, and transmitting mechanism between the die carrier and the cams and between the key levers and the cams for rendering the cam corresponding to the actuated key lever operative to shift the selected die into the plane of the working point.

56. The combination of a plurality of independently rotatable die carriers having groups of dies thereon, some at least of the groups of dies being normally out of the plane of the working point, selective mechanism comprising a series of key levers, a number of cams equal to the number of groups of dies normally outside of the plane of the working point, and transmitting mechanism between the die carriers and the cams and between the key levers and the cams for rendering the cam corresponding to the actuated key lever operative to shift the plurality of die carriers and bring the selected die into the plane of the working point.

57. In a machine for making a line of wrought type a device for slotting the edge only of the blank, said slotting device being mounted independently of the type-making mechanism, said type-making mechanism, and means carried thereby for entering said slots for preventing the displacement of the same.

58. The combination with a blank-holder, a blank-slotting device, means to actuate such device and transversely score the edge of the blank, rolling type-making mechanism for producing a succession of types along the edges of the blank in the holder, and means for entering the scoring to prevent the displacement of the blocks formed thereby.

59. The combination of a blank holder, means for transversely scoring the edge of the blank at predetermined intervals, rolling mechanism acting in a direction longitudinally of the bar in the holder, and means movable in unison therewith for entering the scoring to prevent displacement thereof.

60. The combination with a die mounted on an orbitally revoluble carrier and normally located out of the plane in which it operates, of means for shifting it into that plane, and means for conveying it into and out of the type-forming point with a working movement.

61. The combination with a die mounted on a revoluble carrier and normally located out of the plane in which it operates, of means for shifting it into that plane, and means for conveying it periodically into and out of the type-forming point with a working movement.

62. The combination with orbitally movable die wheels adjustable rotarily and axially, of means for adjusting the same axially, latch mechanisms for adjusting the same rotarily, actuators therefor, and a series of frames each connected to an actuator.

63. The combination with a series of dies, of an orbitally movable body carrying the same, means for adjusting said body angularly and axially, latch mechanisms for producing the angular adjustment, actuators therefor, a series of frames, each connected to an actuator, and means for axially adjusting the same and comprising a number of frames, one for each position of adjustment.

64. The combination with a blank holder, of type making mechanism for making a succession of types along the edge of a blank in the holder, a reciprocatory cutter for scoring the blank, to make a succession of type-blocks along the edge preparatory to the formation of the types thereon and means for reciprocating such cutter.

65. The combination of a blank holder, type making mechanism for making a succession of types along the edge of a blank in the holder, a blank slotting device embodying a reciprocatory saw, a fixed support adjacent to the blank holder and on which the saw is mounted, and means for reciprocating said saw and thereby transversely slotting the edge of the blank.

66. The combination with a blank-holder of type-making mechanism for producing types along the edge of a blank in the said holder, a blank reciprocatory slotting device adjacent to the holder, and means for reciprocating such device transversely of the holder.

67. The combination with an orbitally rotatable carrier, of a die mounted thereon, a lever and intermediate mechanism for shifting the die into and out of an operative plane for rendering the die operative to form a type.

68. The combination with a number of orbitally rotatable die wheels rigid one with the other, levers, and means controlled by the levers for rotating said wheels to render a particular die operative.

Signed at Nos. 9–15 Murray St., New York, N. Y., this 10th day of June, 1908.

FRANCIS H. RICHARDS.

Witnesses:
FRED. J. DOLE,
HENRY E. GREENWOOD.